United States Patent [19]

Wong et al.

[11] Patent Number: 5,413,536
[45] Date of Patent: May 9, 1995

[54] LOW NOISE ACTIVE TRACKING MECHANISM

[75] Inventors: Chee-Chiu J. Wong, Fairport; Walter J. Sanborn, West Henrietta, both of N.Y.

[73] Assignee: Xerox Corporation, Stamford, Conn.

[21] Appl. No.: 143,713

[22] Filed: Nov. 1, 1993

[51] Int. Cl.$^6$ .............................................. F16H 7/00
[52] U.S. Cl. .................................... 474/101; 474/133
[58] Field of Search ............... 474/101, 109, 111, 113, 474/115, 117, 133, 134, 135, 136, 138

[56] References Cited

U.S. PATENT DOCUMENTS

| | | | |
|---|---|---|---|
| 2,913,192 | 11/1959 | Mullin | 242/55.11 |
| 4,459,123 | 7/1984 | Tatsunaka et al. | 474/87 |
| 4,498,889 | 2/1985 | Stevens et al. | 474/133 |
| 4,869,707 | 9/1989 | Zandt et al. | 474/115 |
| 4,878,360 | 11/1989 | Viegas | 474/133 X |
| 4,983,146 | 1/1991 | Charles et al. | 474/115 |

*Primary Examiner*—Michael Powell Buiz

[57] ABSTRACT

A low noise active tracking pulley idler reduces noise and actively tracks belts entrained around it by storing up undesirable impact energy and using it to guide the belts positioned around it. The idler includes an idler that is an integral member and has two cylindrical end portions with a flexible middle portion between them.

12 Claims, 3 Drawing Sheets

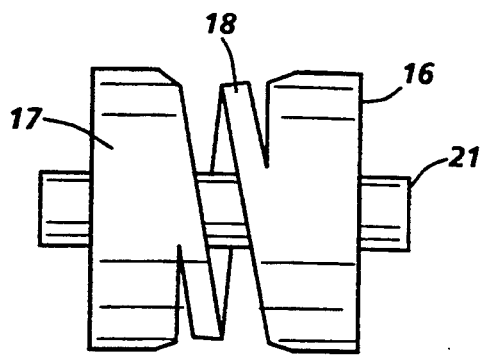
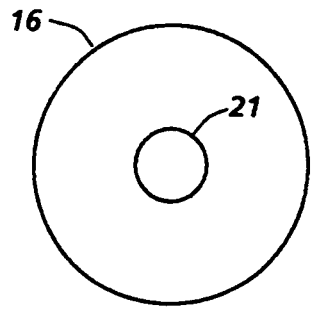
FIG. 3  FIG. 4
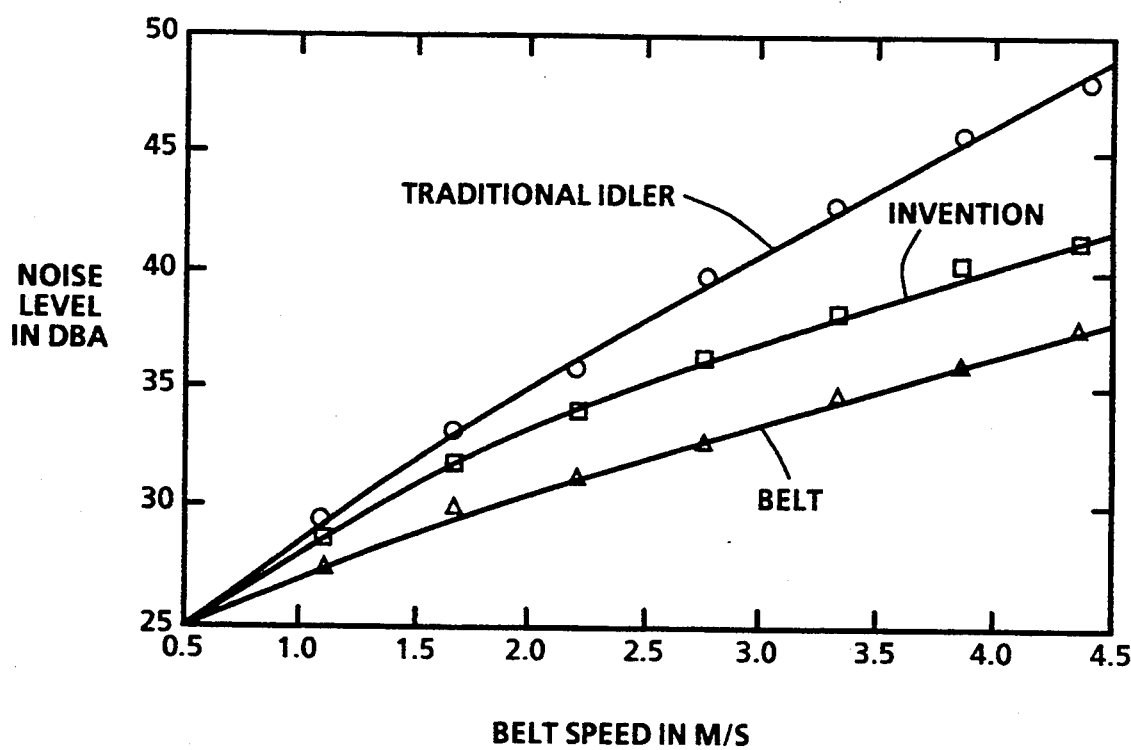
FIG. 5

LOW NOISE ACTIVE TRACKING MECHANISM

BACKGROUND OF THE INVENTION

This invention relates to machine noise control mechanisms, and more particularly, to low noise active tracking idler systems, for use in a wide variety of machines, for example, copier/printers.

Excessive noise from machines, such as, copier/printers in working environments has been an irritant to users from the advent of such machines until the present day. One of the major contributors to machine noise has been found to be timing belt systems which consist of belts, pulleys and idlers. Within these systems, idlers are one of the key sources of noise. At low speed, noise from an idler was as high as that of the timing belt and pulleys combined. At higher speeds, the noise level of an idler has been found to be an order of magnitude higher as shown in FIG. 1. A major source of sound is caused by impact between the idlers and mounting mechanisms. This is induced by the walking of the belts, as well as, the irregularities along the flat side of the belts. Part of the noise generated will be emitted. The rest will be transmitted, amplified and radiated through the frame, panels and covers.

PRIOR ART

Previous belt drive systems include U.S. Pat. No. 2,913,192 which is directed to a tape drive mechanism for driving tapes under constant tension and speed. A resilient flexing spring bent into a curve allows the tape to travel accurately to a recording head. The spring permits compliance in one degree of freedom and appears to be suitable for only light tension applications. A multi-lever and multi-spring system to slow down a portion of a belt temporarily while keeping the rest of the belt at a different speed is disclosed in U.S. Pat. No. 4,869,707. A locking assembly for a photoreceptor belt is shown in U.S. Pat. No. 4,983,146 in which a spring is used to provide an initial tension and the assembly is locked down by a locking arm. After the locking mechanism is engaged, the spring is not functioning. However, rigidly locking a belt as disclosed in this patent appears to cause unwanted and excessive noise and vibrations. U.S. Pat. No. 4,459,123 discloses the arrangement of a single or multiple belt system for maximum drive efficiency. The drive machinery that requires the most torque is located closest to the driving unit. Additional drive units are placed in descending order according to the magnitudes of the drive torques. In view of these patents, a need clearly still exists for a means to control noise in machines.

SUMMARY OF THE INVENTION

Accordingly, disclosed herein is a device for controlling noise and vibration in a belt drive system that comprises a low noise active belt tracking idler which reduces the noise that is generated on the impact of these devices with the mounting mechanism. The idler comprises a spring-like helical portion between two end members for noise abatement and can be made from materials, such as, Nylon and epoxy. Belt tracking is also attained by use of the low noise active belt tracking idler.

BRIEF DESCRIPTION OF THE DRAWINGS

FIGS. 3 and 4 are side and end views of the low noise idler employed in the apparatus of FIG. 2.

FIG. 5 is a graph showing the noise level of the idler of the present invention against that of a conventional idler.

DETAILED DESCRIPTION OF THE INVENTION

Figure 1:
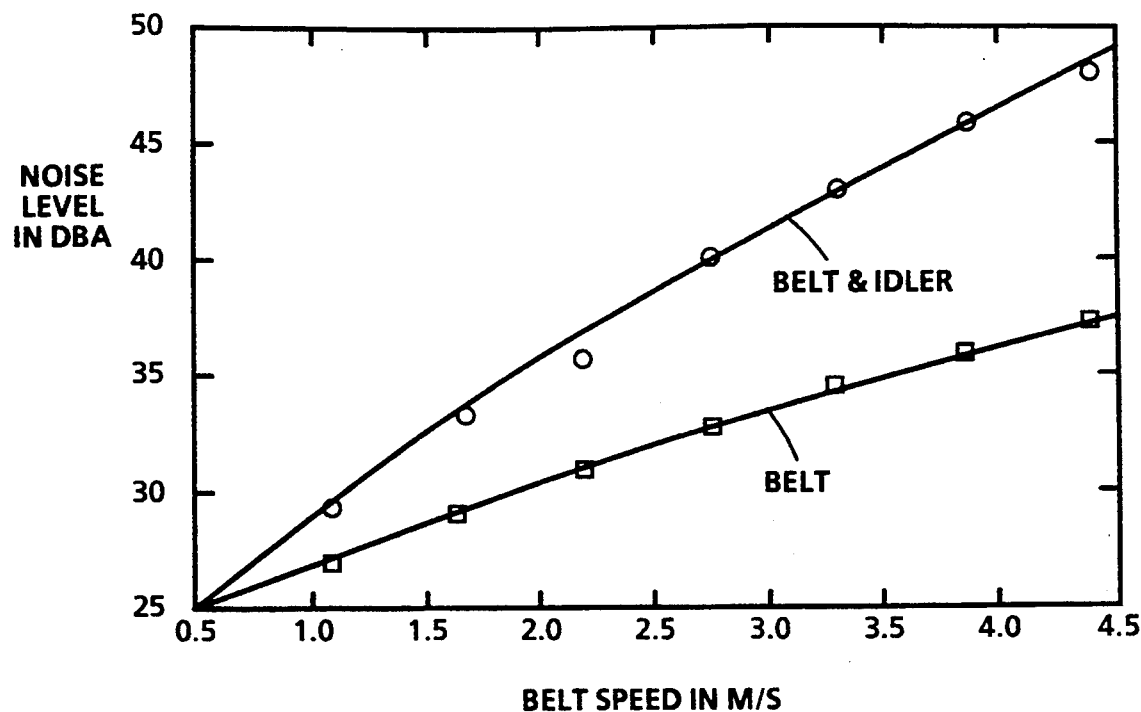
FIG. 1 is a graph showing the noise level of an idler against that of a timing belt.

Belt drive systems in the past that incorporated idlers and timing belts have experienced noise problems whether they were used at low speeds or high speeds. For example, the graph in FIG. 1 shows noise level of an idler and belt vis-a-vis that of a belt with the noise level of the idler and belt being much higher than that of the belt alone. Even at low speeds, the noise level of the idler and belt is higher than that of the belt. In FIG. 1, noise level of the belt system and idler system is represented by ◯) and the noise level of the belt system alone is represented by ☐.

Figure 2:
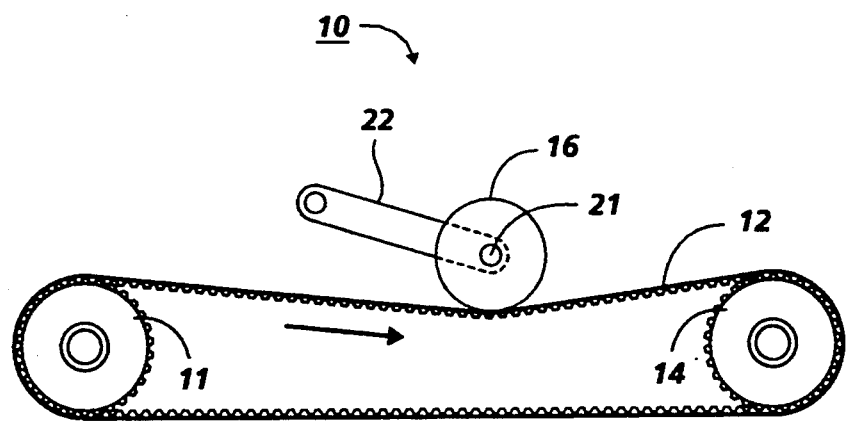
FIG. 2 is a schematic view illustrating a belt drive system utilizing a low noise idler in accordance with the present invention.

To reduce idler noise, one example of an apparatus 10 is shown in FIG. 2 that preferably comprises a low noise idler 16 with noise reduction capability. Idler 16 is also a low noise active tracking device. The invention disclosed is to store up the undesirable impact energy of an idler against its mounting mechanism 21, 22 and use it to guide belts. Under the circumstance, noise from the idler is reduced and if the idler were to be used with a photoreceptor, for example, walking of the photoreceptor belt will be minimized. The low noise active tracking idler 16 can be used to form a nip with any drive roll in the paper path of the machine. In the FIG. 2 arrangement of a drive system for a machine, such as, a conventional copier/printer, a single endless timing belt 12 is shown, which transmits drive power from a drive pulley 14, that in turn drives a pulley 11. The idler 16 is biased against timing belt 12 in an unsupported span between pulleys 14 and 11 through shaft 21 and a shaft support arm 22. Low noise idler 16 comprises an integral roll made of standard idler materials, such as, plastic, elastomer, polymer, polycarbonate, acrylics, Nylon, epoxy and PTFE to reduce noise as shown in FIGS. 3 and 4. A smooth surfaced cylindrical portion 17 of idler 16 is positioned on opposite ends of the idler with a middle helical portion 18 integral with and positioned between the end portions 17. The helical portion of the idler is adapted and configured to move with belt 12 or drive roll of a nip instead of banging off the drive roll in the case of a nip, i.e., jumping up and down on top of the belt or drive roll. The idler can also be made of Delrin, for example, and is configured as a spring-like helical coil instead of a solid roll as is conventional.

Idler 16 of FIG. 2 was tested against a conventional idler and belt system with a marked noise improvement as shown in FIG. 5. In FIG. 5 the symbol ◯ represents the noise level obtained from conventional idler systems while the symbol □ represents results of the idler system of the present invention as shown in FIG. 2. The symbol Δ is used to indicate the noise level of the belt system only. As shown in FIG. 5, idler 16 provided up to 7 dBA or 75% of noise abatement over the conventional design.

Figure 6:
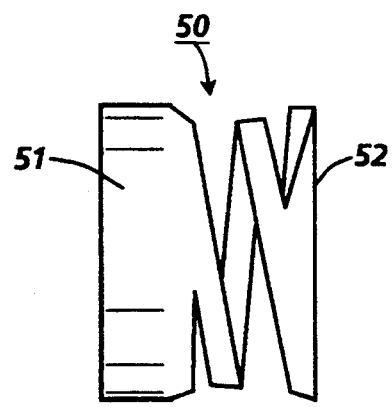
FIGS. 6 and 7 are side and end views of an alternative low noise idler that could be employed in the apparatus of FIG. 2.
Figure 7:
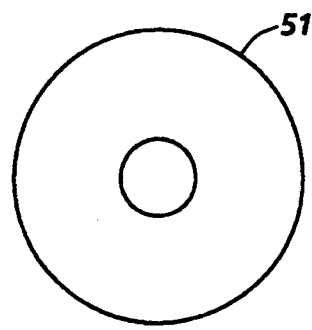

An alternative embodiment of the low noise, active tracking idler of the present invention is shown in FIGS. 6 and 7 which is essentially the low noise idler of FIG. 3 with one end cap removed. Idler 50 comprises an integral roll made of standard idler materials, such as, Delrin, plastic, elastomer, polymer, polycarbonate, acrylics, Nylon, epoxy and PTFE to reduce noise. A smooth surfaced cylindrical portion 51 of idler 50 has a flexible helical member 52 extending orthogonal therefrom. The helical portion of the idler is adapted to move with a belt in order to reduce noise from the belt.

Figure 8:
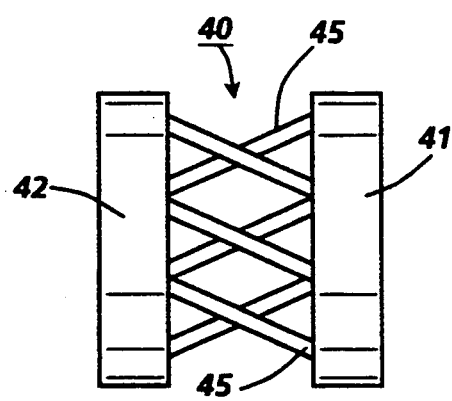
FIGS. 8 and 9 are side and end views of yet another alternative embodiment of a low noise idler that could be employed in the apparatus of FIG. 2.
Figure 9:
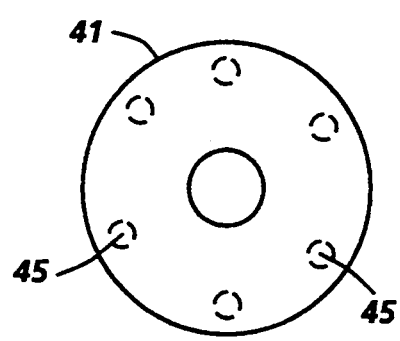

Yet another alternative embodiment of the low noise, active tracking idler of the present invention is shown in FIGS. 8 and 9 and comprises solid cylindrical end members 41 and 42 with flexible spokes 45 connecting the two end members. This idler too is adapted through the use of the flexible spokes 45 to move with a belt so that banging of the idler against the belt is minimized and thereby noise is reduced.

It should be understood that while the low noise tracking idler of this invention has been described in a preferred environment of a timing belt system, the idler could be used in any system that requires the use of idlers or where belt tracking is a problem.

As will be readily understood from the foregoing description, in the belt drive and pulley idler arrangement according to the present invention, noise abatement is attained by including a pulley idler comprised of roll that has a cut-out portion integral with two end portions with the cut-out portion being adapted for noise abatement. The pulley idlers are usable in belt and drive systems including but are not limited to, flat belts, timing belts and V-belts. It is also applicable to all tensioning devices.

The invention has been described in detail with particular reference to the preferred embodiment thereof, but it will be understood that reasonable variations and modifications are possible without departing from the spirit and basic scope of the invention.

We claim:

1. In a belt drive system that includes a belt entrained around spaced apart drive and driven pulleys and a center supported idler biased into the space between the drive and driven pulleys to tension the belt, an improvement that reduces noise generated by the system is characterized by the idler, comprising:

two cylindrical end members; and
an integral, helical portion positioned between said two cylindrical end members, said idler being adapted move with the belt to damp or store vibratory energy created by the belt and thereby minimize noise in the belt drive system.

2. The belt drive system of claim 1, wherein said idler is made of a material from the group consisting of plastic, elastomer, polymer, polycarbonate, acrylics, Nylon, epoxy, Delrin or PTFE.

3. An idler roll adapted to reduce noise generated by a drive system, comprising:

two cylindrical end members; and
a flexible portion positioned between said two cylindrical end members, said flexible portion of said idler being adapted move with the belt to damp or store vibratory energy created by the belt and thereby minimize noise in the belt drive system.

4. The idler roll of claim 3, wherein said idler is made of a material from the group consisting of plastic, elastomer, polymer, polycarbonate, acrylics, Nylon, epoxy, Delrin or PTFE.

5. The idler roll of claim 4, wherein said flexible portion is configured as a helix.

6. The idler roll of claim 4, wherein said flexible portion includes cut-out areas.

7. An idler roll adapted to reduce noise generated by a drive system, comprising:

a cylindrical end member; and
a spring-like, flexible member extending orthogonal to said cylindrical end member, said flexible member being adapted move with the belt to damp or store vibratory energy created by the belt and thereby minimize noise in the belt drive system.

8. The idler roll of claim 7, including a second cylindrical end member positioned on the end non-enclosed end of said coil member.

9. The idler roll of claim 8, wherein said flexible member is shaped like a coil.

10. An idler roll adapted to reduce noise generated by a drive system, comprising:

two cylindrical end members; and
at least one flexible member positioned between said two cylindrical end members, said idler being adapted move with the belt to damp or store vibratory energy created by the belt and thereby minimize noise in the belt drive system.

11. The idler roll of claim 10, wherein said flexible member includes a plurality of spokes.

12. The idler roll of claim 3, wherein said two cylindrical end members and said helical portion are integrally molded into a single composite member.

* * * * *